(12) United States Patent
Aoki (10) Patent No.: US 10,688,483 B2
(45) Date of Patent: Jun. 23, 2020

(54) HONEYCOMB STRUCTURE

(71) Applicant: NGK INSULATORS, LTD., Nagoya (JP)

(72) Inventor: Yoichi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 149 days.

(21) Appl. No.: 15/926,157

(22) Filed: Mar. 20, 2018

(65) Prior Publication Data

US 2018/0280961 A1     Oct. 4, 2018

(30) Foreign Application Priority Data

Mar. 30, 2017   (JP) ................... 2017-068344

(51) Int. Cl.
  B32B 3/12      (2006.01)
  B01J 35/04    (2006.01)
  (Continued)

(52) U.S. Cl.
  CPC ............ B01J 35/04 (2013.01); B01D 46/247 (2013.01); B01D 46/2429 (2013.01); B01D 46/2474 (2013.01); B01J 35/023 (2013.01); C04B 35/195 (2013.01); C04B 35/638 (2013.01); C04B 38/0006 (2013.01); C04B 38/0009 (2013.01); F01N 3/2828 (2013.01); *B01D 2046/2433* (2013.01); *B01D 2046/2485* (2013.01); *B01D 2046/2492* (2013.01); *C04B 2235/3206* (2013.01); *C04B 2235/3217* (2013.01); *C04B 2235/3418* (2013.01); *C04B 2235/606* (2013.01);
  (Continued)

(58) Field of Classification Search
  None
  See application file for complete search history.

(56) References Cited

U.S. PATENT DOCUMENTS 4,740,408 A * 4/1988 Mochida ................ B01D 46/10
                                                                    422/179

FOREIGN PATENT DOCUMENTS

EP           2554235 A1 *  2/2013  ........... B01D 46/247
JP        S62-266298 A1   11/1987
JP           08238431 A *  9/1996

OTHER PUBLICATIONS

Ogawa et al., machine translation of JPH08238431, Sep. 17, 1996 (Year: 1996).*

* cited by examiner

*Primary Examiner* — David Sample
*Assistant Examiner* — Mary I Omori
(74) *Attorney, Agent, or Firm* — Burr & Brown, PLLC (57) ABSTRACT

A honeycomb structure including: a honeycomb structure body having porous partition walls which are disposed to surround a plurality of cells and a circumferential wall, wherein the partition walls are provided with protrusions, at least one of the plurality of cells includes a specific cell configured so that the protrusions protrude into the cell from the respective partition walls, and the specific cell is provided with a porous material made of the same material as the partition walls in a range of 5 to 50% including an intersection with respect to a pentagonal area which is formed by connecting the intersection when two partition walls configuring the peripheral edge of the specific cell extend and two points of bottom parts and top parts, respectively, of the respective protrusions disposed on the two partition walls, in the cross section orthogonal to the extending direction of the cells.

2 Claims, 2 Drawing Sheets

(51) Int. Cl.
  *B01D 46/24* (2006.01)
  *C04B 38/00* (2006.01)
  *C04B 35/195* (2006.01)
  *C04B 35/638* (2006.01)
  *B01J 35/02* (2006.01)
  *F01N 3/28* (2006.01)
(52) U.S. Cl.
  CPC ............... *C04B 2235/6021* (2013.01); *C04B 2235/6562* (2013.01); *C04B 2235/6567* (2013.01); *C04B 2235/77* (2013.01); *F01N 2330/34* (2013.01); *F01N 2330/38* (2013.01)

HONEYCOMB STRUCTURE

The present application is an application based on JP-2017-068344 filed on Mar. 3, 2017 with the Japan Patent Office, the entire contents of which are incorporated herein by reference.

BACKGROUND OF THE INVENTION

Field of the Invention

The present invention relates to a honeycomb structure. More particularly, the present invention relates to a honeycomb structure which can be particularly suitably used as a catalyst carrier for loading a catalyst for exhaust gas purification.

Description of the Related Art

In recent years, awareness of environmental problems has been increasing in society as a whole. For this reason, in the field of technologies to burn fuel to generate power, various technologies for removing harmful components such as nitrogen oxides from the exhaust gas generated during combustion of fuel have been developed. As various technologies for removing the harmful components, for example, various technologies for removing harmful components such as nitrogen oxides have been developed from exhaust gas emitted from automobile engines. In removing the harmful components from the exhaust gas, it is common to cause a chemical reaction to the harmful components using a catalyst and convert the harmful components into another component which is relatively harmless. A honeycomb structure has been used as a catalyst carrier for loading the catalyst for the exhaust gas purification.

Conventionally, as the honeycomb structure, there has been proposed a honeycomb structure including a honeycomb structure body having porous partition walls defining a plurality of cells as fluid channels. As this honeycomb structure, there has been proposed a honeycomb structure provided with fins protruding inward from a partition wall to increase a geometric surface area of the partition wall (for example, see Patent Document 1).

CITATION LIST

Patent Document

[Patent Document 1] JP-A-62-266298

SUMMARY OF THE INVENTION

In the honeycomb structure of Patent Document 1, the geometric surface area of the partition wall can be increased by the fins disposed on the partition wall. However, in the honeycomb structure of Patent Document 1, a flow of exhaust gas between two adjacent fins tends to stagnate, which was a factor of lowering contact property with a catalyst, in particular, at a high flow rate (specifically, at a space velocity of about 8,300 (1/hour) or more). In particular, in the honeycomb structure of Patent Document 1, it is preferable that the same number of fins is disposed on each side configuring the cell. In this case, there is a problem in that the stagnation of the flow of the exhaust gas is very likely to occur and the deterioration in the purification performance cannot be suppressed when the flow rate is large (at the high flow rate).

The present invention has been made considering the problems of the prior art. An object of the present invention is to provide a honeycomb structure which can be particularly suitably used as a catalyst carrier for loading a catalyst for exhaust gas purification. In particular, the honeycomb structure which is hard to cause the stagnation of the flow of the exhaust gas in the cell and is expected to improve the purification performance when being used as the catalyst carrier.

According to the present invention, a honeycomb structure shown below is provided.

According to a first aspect of the present invention, a honeycomb structure is provided including: a pillar-shaped honeycomb structure body having a porous partition walls which are disposed in a lattice shape in a cross section orthogonal to an extending direction of cells to surround a plurality of cells as a fluid channel extending from a first end face to a second end face and a circumferential wall disposed to surround the partition walls, wherein the partition walls are provided with protrusions which protrude to extend into the cells and are continuously disposed in the extending direction of the cells, at least one of the plurality of cells includes a specific cell configured so that the protrusions protrude into the cell from the respective partition walls configuring a peripheral edge of the cell, in the cross section orthogonal to the extending direction of the cells, and the specific cell is provided with a porous material made of the same material as the partition walls in a range of 5 to 50% including an intersection with respect to a pentagonal area which is formed by connecting the intersection when two partition walls configuring the peripheral edge of the specific cell extend and two points of bottom parts and top parts, respectively, of the respective protrusions disposed on the two partition walls, in the cross section orthogonal to the extending direction of the cells.

According to a second aspect of the present invention, the honeycomb structure according to the first aspect is provided, wherein when a part configured by disposing the porous material in the range of 5 to 50% including the intersection is a porous material disposition corner portion, a ratio of the total number of porous material disposition corner portions to the total number of intersections on the two adjacent partition walls configuring the peripheral edge of the cell is 50 to 100%.

Since the honeycomb structure of the present invention has the protrusions provided to protrude into the cells, the geometric surface area of the partition walls can be increased by the protrusions. In particular, the honeycomb structure of the present invention can hardly cause the stagnation of the flow of the exhaust gas and improve the purification performance when being used as the catalyst carrier.

DESCRIPTION OF THE PREFERRED EMBODIMENTS

Embodiments of the present invention will now be described with reference to the accompanying drawings. The present invention is not limited to the following embodiments. Therefore, it should be understood that appropriate changes, improvements and the like of the following embodiments based on the ordinary knowledge of those skilled in the art fall within the scope of the present invention without deviating from the purposes of the present invention.

Figure 1:
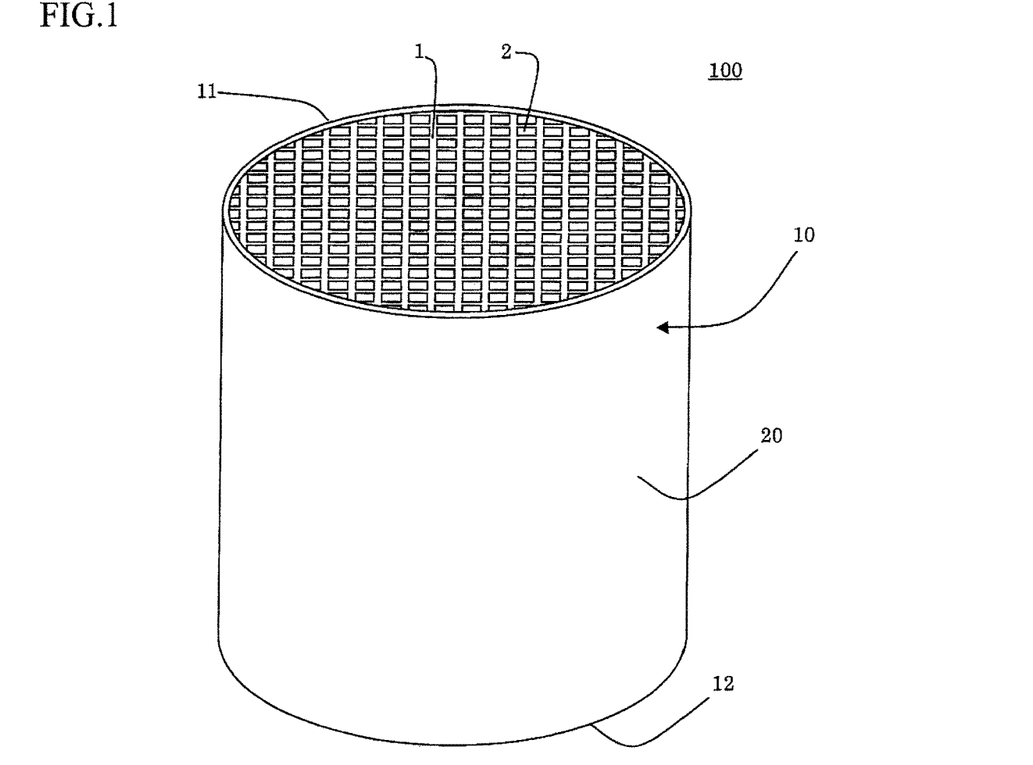
FIG. 1 is a perspective view schematically showing a honeycomb structure according to an embodiment of the present invention.
Figure 2:
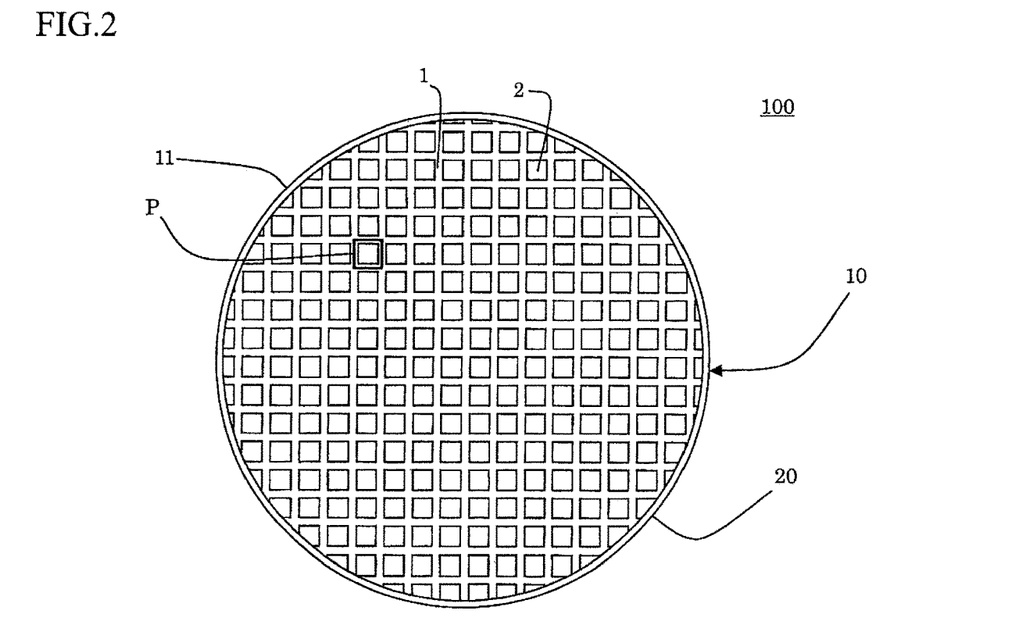
FIG. 2 is a plane view schematically showing an inflow end face in the honeycomb structure according to the embodiment of the present invention.
Figure 3:
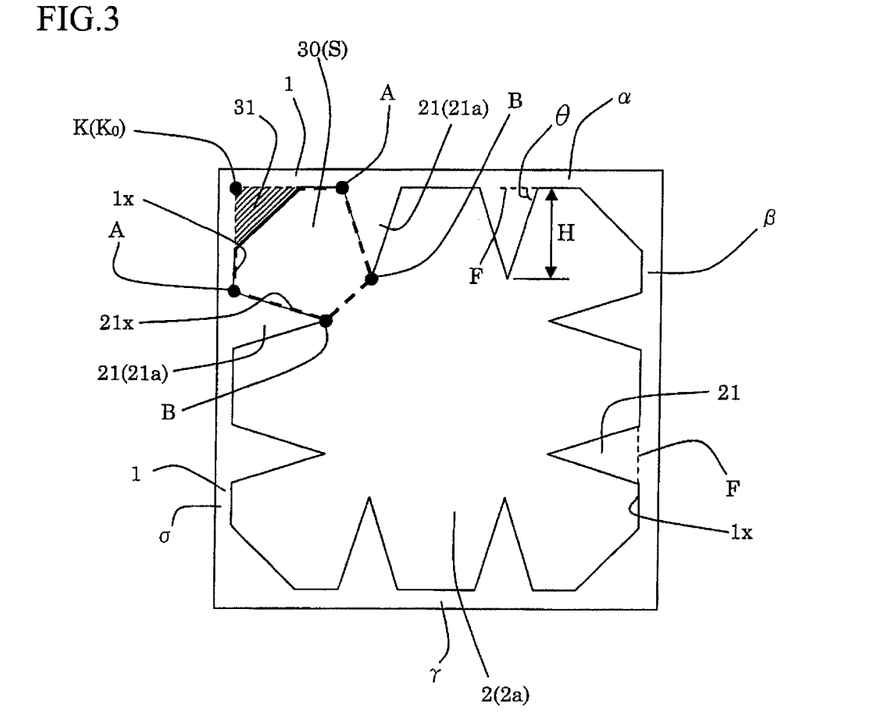
FIG. 3 is a plane view schematically showing an enlarged part of the inflow end face shown in FIG. 2.

(1) Honeycomb Structure:

An embodiment of a honeycomb structure of the present invention is a honeycomb structure 100 shown in FIGS. 1 to 3. The honeycomb structure 100 has a pillar-shaped honeycomb structure body 10. The honeycomb structure body 10 has porous partition walls 1 and a circumferential wall 20 disposed to surround the partition walls 1. The partition walls 1 are disposed in a lattice shape in a cross section orthogonal to an extending direction of cells 2 to surround a plurality of cells 2 as a fluid channel extending from a first end face 11 to a second end face 12. The partition walls 1 have protrusions 21 which protrude to extend into the cells 2 and are continuously disposed in the extending direction of the cells 2. The honeycomb structure 100 includes a specific cell 2a which is at least one of the plurality of cells 2. In the cross section orthogonal to the extending direction of the cells 2, the specific cell 2a is configured so that the protrusions 21 protrude into the cell 2 from each partition walls 1 configuring a peripheral edge of the cell 2. Further, in the cross section orthogonal to the extending direction of the cells 2, an intersection when two partition walls 1 configuring the peripheral edge of the specific cell 2a extend is defined as an intersection K. In the cross section orthogonal to the extending direction of the cells 2, an area of a pentagonal region (porous material disposition region 30), which is formed by connecting the intersection K and two points of bottom parts A and top parts B, respectively, of each protrusion 21 disposed on the two partition walls 1, is defined as a reference area S. In this case, in the honeycomb structure 100, a porous material disposition corner portion 31 at which a porous material which is the same material as the partition walls 1 is disposed in the pentagonal region (porous material disposition region 30). Here, the porous material disposition corner portion 31 is disposed in a range of 5 to 50% including the intersection K with respect to the reference area S which is the area of the porous material disposition region 30. In other words, a part configured by disposing the porous material in the range of 5 to 50% including the intersection K with respect to the reference area S is defined as the porous material disposition corner portion. That is, the cell provided with the protrusions and having the porous material disposition corner portion corresponds to the "specific cell".

Since the honeycomb structure 100 has the protrusions 21 provided to protrude into the cells 2, it is possible to increase the geometric surface area of the partition walls 1.

Figure 4:
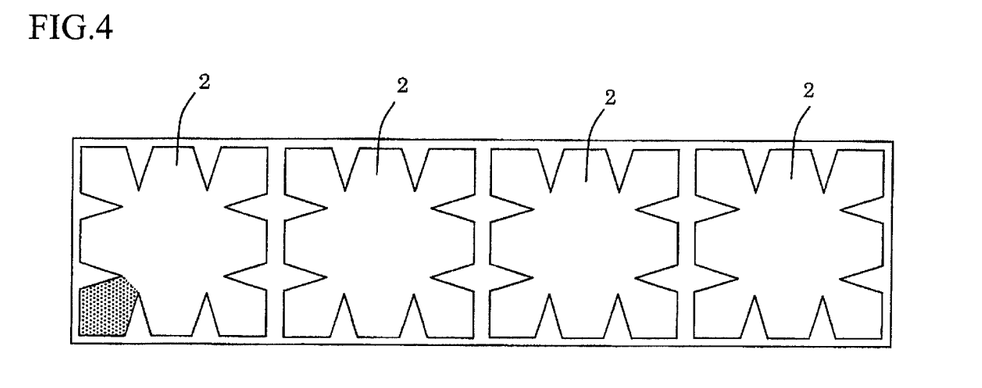
FIG. 4 is a plane view schematically showing an enlarged part of an inflow end face in the existing honeycomb structure.

In particular, the honeycomb structure 100 is hard to cause a stagnation of a flow of exhaust gas even when the flow rate of exhaust gas is large (at the high flow rate), and can improve purification performance after the loading of the catalyst when being used as a catalyst carrier. Specifically, in the existing honeycomb structure provided with the fin, the flow of the exhaust gas tends to stagnate at the corner portion (corner portion like a region indicated by a dot in FIG. 4) of the cell 2, which is a factor of lowering contact property of the catalyst with the exhaust gas, in particular, when the flow rate of the exhaust gas is large (at the high flow rate). It should be noted that the flow of the exhaust gas tends to stagnate at the corner portion as the exhaust gas approaches the region in the vicinity of the surface of the partition walls. In this respect, in the honeycomb structure 100, since the specific cell 2a satisfying the predetermined condition is formed, as described above, the stagnation of the flow of the exhaust gas is hard to occur even at a high flow rate of the exhaust gas. In other words, it is possible to prevent the stagnation of the flow of the exhaust gas from occurring in advance by forming the porous material disposition corner portion 31 in the specific cell 2a. In this way, the contact property of the catalyst with the exhaust gas in the specific cell is improved, and as a result the improvement in the purification performance of the honeycomb structure 100 after the loading of the catalyst is achieved.

Since the catalyst loaded in the part where the flow of the exhaust gas stagnates is small in the contribution to the purification of the exhaust gas, the effect obtained by the loading of the catalyst is not sufficient and the catalyst is wasted. It is possible to prevent the catalyst from being wasted by forming the specific cell 2a.

(1-1) Partition Wall:

The partition walls 1 are disposed in a lattice shape in the cross section orthogonal to the extending direction of the cells 2. The partition walls 1 are disposed in a "lattice shape", and an intersection part of one wall and the other wall which configure the partition walls is provided with the corner portion. In other words, if the protrusions 21 are not provided, the cross section shape of the cell 2 defined by the partition walls 1 is, for example, a polygon such as a quadrangle and a hexagon. In this case, the apex of the polygon becomes a shape having a corner portion (i.e., the corner portion is not chamfered). The honeycomb structure of the present invention has a structure in which the porous material is disposed at a predetermined position of the partition walls disposed in the lattice shape. By such a configuration, as described above, the flow of the exhaust gas is hard to stagnate even at the high flow rate of the exhaust gas, and the improvement in the purification performance of the honeycomb structure 100 is achieved.

In the honeycomb structure 100, the partition walls 1 have the protrusions 21. For this reason, if the catalyst is loaded in the honeycomb structure 100, the loading area of the catalyst is increased by the number of protrusions 21 disposed in the honeycomb structure 100, compared with the honeycomb structure in which the protrusion 21 is not disposed. As a result, the contact property of the catalyst with the exhaust gas is improved, and the purification performance of the exhaust gas is improved. The protrusions 21 protrude into the cell 2 from each partition walls 1 configuring the peripheral edge of the cell 2 in the cross section orthogonal to the extending direction of the cells 2.

The shape of the protrusion 21 is not particularly limited in the cross section orthogonal to the extending direction of the cells. For example, in the cross section orthogonal to the extending direction of the cells, the protrusion 21 can have a polygonal shape such as a triangular shape and a quadrangular shape, a semicircular shape and the like. Among these shapes, the protrusion 21 preferably has the triangular shape. If the protrusions 21 have the triangular shape, it is possible to suppress a pressure loss from increasing as compared with other shapes while securing the loading area of the catalyst (while securing substantially the same loading area as the case of other shapes).

In the cross section orthogonal to the extending direction of the cells, an angle θ of a base portion of the protrusion 21 is preferably 40 to 70°, more preferably 45 to 65°. If the angle of the protrusions is within the above range, it becomes difficult for the catalyst to be thickly accumulated at the bases of the protrusions when the catalyst is applied to a surface of the partition walls (i.e., at the time of coating the catalyst). For this reason, it is possible to increase the surface area after the catalyst is applied to the surface of the partition walls (i.e., after the catalyst coating), and as a result, the purification performance of the exhaust gas is improved. If the angle is less than the lower limit value, in the case of making the height of the protrusion the same while changing the angle, a volume of the protrusion is increased. For this reason, since the heat capacity of the honeycomb structure increases, there is a possibility that it takes time until the catalyst reaches an activation temperature and the purification performance of the exhaust gas deteriorates. If the angle exceeds the upper limit value, there is a possibility that a large amount of catalyst may be accumulated at the bases of the protrusions at the time of the catalyst coating. In other words, the thick layers of the catalyst tend to be formed at the bases of the protrusions. For this reason, there is a possibility that the catalyst in the lower layer portion (portion close to the partition walls) of this catalyst layer is not effectively used. The angle of the protrusions is measured as follows. First, a "height H of the protrusion" which is a shortest distance from a highest position of the protrusion to a base line F is obtained. A straight line parallel to the base line F is drawn at a position of ½ of the "height H of the protrusion", and the intersection K of the straight line and each side (side surface) of a triangle excluding the base line F is obtained. Thereafter, a tangential line to the side surface at the intersection K is drawn, and an angle formed by this tangential line and the base line F is obtained, which is defined as an angle θ. It should be noted that the angle of the protrusion is an angle corresponding to an acute angle among angles formed by the surface of the partition wall and a side surface of the protrusion.

A ratio of a height of the protrusion 21 to a hydraulic diameter of the cell is preferably 4 to 40%, more preferably 4 to 30%. The height of each protrusion may be the same or may be different. In addition, the hydraulic diameter of the cell is a value calculated by 4×(cross-sectional area)/(circumferential length) based on a cross-sectional area and a circumferential length of each cell. The cross-sectional area of the cell indicates an area of the shape (cross section shape) of the cell appearing in the cross section vertical to a central axis direction of the honeycomb structure, and the circumferential length of the cell indicates a length (length of closed line surrounding the cross section) around the cross section shape of the cell.

The number of protrusions 21 is not particularly limited, and therefore an arbitrary number of protrusions 21 can be disposed on each partition walls configuring one cell. It should be noted that the number of protrusions 21 disposed on each partition walls can be specifically 1 to 3, preferably 3 or less. In other words, in the specific cell, the number of protrusions disposed on each side is preferably equal to or less than 3. By doing so, it is effective from the viewpoint that the exhaust gas more satisfactorily flows between the adjacent protrusions, the stagnation of the flow of the exhaust gas hardly occurs even at the high flow rate, and the purification performance is improved. In other words, if the number of protrusions 21 is equal to or more than 4, the gap between the adjacent protrusions tends to become too narrow and the pressure loss tends to be increased.

The position of the protrusion 21 can be appropriately determined without any particular limitation. For example, the position of the protrusion 21 can be set to be a position at which a side at which the protrusion 21 is disposed is equally divided. For example, FIG. 3 shows an example in which the two protrusions 21 disposed on each side are disposed to trisect each side.

The thickness of the partition wall 1 is preferably 40 to 230 μm, more preferably 40 to 178 μm. If the thickness of the partition wall is less than the lower limit value, there is a possibility that mechanical strength may be insufficient. If the thickness of the partition wall exceeds the upper limit value, there is a possibility that the pressure loss of the honeycomb structure is increased. It should be noted that the thickness of the partition walls is a thickness of a part at which the protrusions are not disposed.

There is no particular limitation on a material of the partition wall 1. For example, it is preferable to use ceramic as a main component. Specifically, the material of the partition walls 1 is preferably at least one selected from the group consisting of silicon carbide, a silicon-silicon carbide based composite material, cordierite, mullite, alumina, aluminum titanate, silicon nitride, and silicon carbide-cordierite based composite material.

(1-2) Cell:

In the honeycomb structure of the present invention, one or more cells of the plurality of cells are the specific cell. The specific cell is configured so that the protrusions protrude and is an inside space (fluid channel) in which the porous material disposition corner portion is formed. In the honeycomb structure of the present invention, the flow of the exhaust gas is prevented from stagnating when the flow rate of the exhaust gas is large in the specific cell and the contact property of the catalyst with the exhaust gas becomes high. As a result, the purification performance of the exhaust gas in the honeycomb structure (in particular, the honeycomb structure after the catalyst is loaded) is improved.

The porous material disposition region means a "pentagonal region" formed as follows in the cross section orthogonal to the extending direction of the cells 2. This "pentagonal region" is formed by connecting the intersection K (reference intersection $K_0$) when two partition walls 1 configuring the peripheral edge of the specific cell 2a extend to two points of the bottom parts A and the top parts B, respectively, of each protrusion 21 disposed on the two partition walls 1, as shown in FIG. 3. In the present invention, when the area of the porous material disposition region 30 is defined as the reference area S, with respect to the reference area S, it is necessary for the porous material disposition corner portion 31 (portion where the porous material is disposed in a range of 5 to 50% including the reference intersection $K_0$) to be formed. It should be noted that the reference intersection $K_0$ is defined as the intersection when the two partition walls 1 adjacent to each other extend. In addition, the bottom part A and top part B refer to the bottom part A and the top part B of the protrusion (reference protrusion 21a) closest to the reference intersection $K_0$ among the protrusions 21 disposed on each of the two partition walls 1 intersecting each other. The "bottom part" mean the intersection of the side surface of the reference protrusion 21a (side surface close to the reference intersection $K_0$ (neighboring side surface 21x)) and a surface 1x of the partition wall 1 in the cross section orthogonal to the extending direction of the cells 2. Further, the "top part" means a highest position from the surface 1x of the partition wall 1 on the neighboring side surface 21x of the reference protrusion 21a in the cross section orthogonal to the extending direction of the cells 2. In addition, the "including the intersection" means that a contour line of the porous material disposition corner portion 31 passes through the reference intersection $K_0$ in the cross section orthogonal to the extending direction of the cells 2. It should be noted that the stagnation of the flow of the exhaust gas is prevented from occurring at the high flow rate of the exhaust gas by setting the porous material disposition corner portion 31 to be in the range including the intersection. That is, it is important that the porous material is disposed in the "range including the intersection" in the porous material disposition region.

The porous material disposition corner portion made of a porous material which is the same material as the partition walls 1. For example, the partition walls and the porous material disposition corner portions may be integrally formed, or the partition walls and the porous material disposition corner portions may be separated from each other (i.e., are not integrally formed).

As described above, the porous material disposition corner portion is formed in the range of 5 to 50% including the intersection K with respect to the reference area S which is the area of the porous material disposition region. Preferably, the porous material disposition corner portion is formed in a range of 10 to 40% including the intersection K and more preferably, the porous material disposition corner portion is formed in a range of 10 to 30% including the intersection K. The stagnation of the flow of the exhaust gas is prevented from occurring at the high flow rate of the exhaust gas in the specific cell by setting the ratio of the porous material disposed in the porous material disposition region to be in the range. As a result, the purification performance of the exhaust gas in the honeycomb structure (in particular, the honeycomb structure after the catalyst is loaded) is improved.

There is no particular limitation on the number of porous material disposition corner portions formed in one specific cell, and therefore the porous material disposition corner portions may be formed at all corner portions of the cell or one corner portion. In other words, for example, the porous material disposition corner portion 31 may be formed at all of the four corner portions as shown in FIG. 3 in a cell having a quadrangular cross section shape, and the porous material disposition corner portion 31 may be formed at one corner portion.

Here, the ratio of the total number of porous material disposition corner portions 31 to the total number of intersections of two adjacent partition walls configuring the peripheral edge of the cells is preferably 50 to 100%, more preferably 60 to 100%. In other words, it is preferable that the porous material disposition corner portions 31 are formed when the total number of intersections is equal to or more than 50%. By doing so, the purification performance of the exhaust gas is more improved in the honeycomb structure after the catalyst is loaded.

It should be noted that the honeycomb structure of the present invention may be provided with a cell (i.e., normal cell) in which any of the protrusion and the porous material disposition corner portion is disposed. The ratio of the total number of normal cells to the total number of cells is not particularly limited.

The surface shape of the porous material disposition corner portion (shape of the surface exposed to the specific cell) is not particularly limited. For example, in FIG. 3, although the surface shape is a linear shape (planar shape), it may be a concavely or convexly curved shape or the like.

The shape (shape of the cell in the cross section orthogonal to the extending direction of the cells) of the cell is not particularly limited and therefore can be, for example, a polygon such as a triangle, a quadrangle, a pentagon, a hexagon, and an octagon, or a combination of a quadrangle, a hexagon, an octagon, or the like. Among them, the quadrangle is preferable. It should be noted that the "shape of the cell" means a shape in a state in which the protrusion and the porous material disposition corner portion are not disposed. The protrusion is a portion cut off by a plane F (see FIG. 3) obtained by the extension of the surface 1x of the partition wall 1.

(1-3) Circumferential Wall:

The circumferential wall 20 is a wall disposed to surround the partition walls 1. The circumferential wall 20 may be integrally formed with the partition walls 1.

The thickness of the circumferential wall 20 is preferably 0.1 to 6.0 mm, particularly preferably 0.1 to 3.0 mm. If the thickness of the circumferential wall 20 is less than the lower limit value, the mechanical strength may be lowered. If the thickness of circumferential wall 20 exceeds the upper limit value, it may be necessary to secure the large space to accommodate the honeycomb structure.

The cell density of the honeycomb structure 100 is preferably 31 to 155 cells/cm$^2$, particularly preferably 43 to 148 cells/cm$^2$. If the cell density is less than the lower limit value, there is a possibility that the strength is not maintained. If the cell density exceeds the upper limit value, there is a possibility that the pressure loss of the honeycomb structure is increased.

(2) Method for Manufacturing Honeycomb Structure:

The honeycomb structure of the present invention can be manufactured by a method including a honeycomb forming process and a firing process. Each process is described below.

(2-1) Honeycomb Forming Process:

In this process, a ceramic forming raw material containing a ceramic raw material is formed to form a honeycomb formed body having the partition walls disposed to define a plurality of cells as a fluid channel.

As the ceramic raw material contained in the ceramic forming raw material, at least one selected from the group consisting of a cordierite forming raw material, cordierite, silicon carbide, silicon-silicon carbide based composite material, mullite, aluminum titanate is preferable. It should be noted that the cordierite forming raw material is a ceramic raw material blended to have a chemical composition having a range of 42 to 56 mass % of silica, 30 to 45 mass % of alumina and 12 to 16 mass % of magnesia. The cordierite forming raw material is fired to become the cordierite.

In addition, the ceramic forming raw material can be prepared by mixing a dispersing medium, an organic binder, an inorganic binder, a pore former, a surfactant and the like with the above ceramic raw material. The composition ratio of each raw material is not particularly limited, and therefore it is preferable to set a composition ratio according to the structure, material and the like of the honeycomb structure to be manufactured.

When the ceramic forming raw material is formed, first, the ceramic forming raw material is kneaded to obtain a kneaded material, and the obtained kneaded material is formed into the honeycomb shape. Examples of a method of kneading a ceramic forming raw material to form a kneaded material can include a method using a kneader, a vacuum pugmill and the like. Examples of a method for forming a honeycomb formed body by forming a kneaded material can include the known forming methods such as extrusion and injection molding.

Specifically, a method for forming a honeycomb formed body by performing extrusion using a die, and the like can be a preferable example. As a material of the die, cemented carbide which is hard to be worn is preferable.

It is preferable to use the die manufactured in the following manner. In other words, first, the die (conventional type die) used for manufacturing the conventionally known honeycomb structure without fins is prepared. Thereafter, regions complementary to the protrusions (regions in which the protrusions are formed by penetrations of the kneaded material) are formed by performing electric discharge machining from slits (gaps for forming the partition walls) of the conventional die toward the outside. Further, it is formed by performing electric discharge machining on regions having a shape complementary to the porous material disposition corner portions at intersecting parts (parts which are the intersections of the partition walls) of slits of the conventional type die. In this manner, a predetermined die can be manufactured.

The honeycomb formed body satisfying the conditions of the honeycomb structure of the present invention can be conveniently manufactured by using the die.

The shape of the honeycomb formed body is not particularly limited, and therefore examples of the shape of the honeycomb formed body may include a round pillar shape, an elliptical shape, and a polygonal prismatic columnar shape having an end face of "square, rectangle, triangle, pentagon, hexagon, octagon and the like".

In addition, the obtained honeycomb formed body can be dried after the above-mentioned forming. The drying method is not particularly limited. Examples of the drying method may include hot air drying, microwave drying, dielectric drying, reduced pressure drying, vacuum drying, freeze drying and the like. Among those, it is preferable to perform the dielectric drying, the microwave drying, or the hot air drying alone or in combination.

(2-2) Firing Process:

Next, the honeycomb formed body is fired to manufacture the honeycomb fired body. The firing (main firing) of the honeycomb formed body sinters the forming raw material configuring the calcinated honeycomb formed body to densify the forming raw material and is performed to secure a predetermined strength. Since the firing conditions (temperature, time, atmosphere and the like) vary depending on the kind of forming raw materials, it is necessary to select an appropriate condition according to the kind of forming raw materials. For example, in the case of using the cordierite forming raw material, the firing temperature is preferably 1410 to 1440° C. In addition, the firing time is preferably 4 to 8 hours as a keep time at a maximum temperature. Examples of an apparatus for performing calcination and main firing may include an electric furnace, a gas furnace and the like. The honeycomb fired body thus obtained can be used as the honeycomb structure of the present invention. The method for manufacturing a honeycomb structure may further include a circumference coat process as shown below.

As described above, although the porous material disposition corner portions may be integrally formed with the partition walls using the die, the porous material disposition corner portions may be separately formed from the partition walls using slurry made of the porous material which is the same material as the partition walls. Specifically, first, the honeycomb formed body having the protrusions is manufactured, and the slurry is deposited at the corner portions of the cells by a method of pouring the slurry into the cells of the honeycomb formed body and the like and then the firing process may be performed.

(2-3) Circumference Coat Process:

In the process, the circumference of the obtained honeycomb fired body is applied with a circumference coat material to form the circumferential wall. It should be noted that the circumferential wall may be formed to be integrated with the partition walls at the time of manufacturing the honeycomb formed body. It is possible to prevent the honeycomb structure from being chipped when an external force is applied to the honeycomb structure by further forming the circumferential wall by the circumference coat process.

Examples of the circumference coat material may include those obtained by adding water to those, which are obtained by adding additives such as an organic binder, a foamable resin, and a dispersing agent to inorganic raw materials such as an inorganic fiber, colloidal silica, clay, and SiC particles, and kneading them. Examples of the method for applying a circumference coat material may include a method for coating a "cut honeycomb fired body" using a rubber spatula or the like while rotating the "cut honeycomb fired body" on a spinning lathe.

EXAMPLES

Hereinafter, the present invention is specifically described based on examples, but the present invention is not limited to these examples.

Example 1

In Example 1, first, the forming raw material for manufacturing the honeycomb structure was prepared. Specifically, the forming raw material was prepared by adding a binder, a surfactant, a pore former, and water to a ceramic raw material. As the ceramic raw material, kaolin, talc, and alumina which are the cordierite forming raw material was used.

Next, the obtained forming raw material was kneaded with the kneader and then pug-milled in the vacuum pugmill to form the kneaded material. Next, the obtained kneaded material was extruded using the die to manufacture the honeycomb formed body. The die provided with the specific cells in which the protrusions and the porous material disposition corner portions were formed was used. After the firing of the honeycomb formed body, the thickness of the partition wall became 0.089 mm, and the cell density became 62 number/cm$^2$. The shapes of the cells of the honeycomb formed body become a quadrangle. The honeycomb formed body becomes a round pillar shape. A diameter of the end faces of each of the round pillar-shaped honeycomb formed body becomes 118.4 mm after the firing. It should be noted that the above-mentioned die was designed so that the manufactured honeycomb structure satisfies each condition shown in the following Tables 1 and 3.

Next, the honeycomb dried body was obtained by drying the honeycomb formed body. As the drying, the microwave drying was first performed and then the hot air drying was performed at the hot air temperature of 120° C. for 2 hours. Next, both end portions of the honeycomb dried body were cut.

Next, the obtained honeycomb dried body was degreased. The degreasing was performed at 450° C. for 5 hours. Next, the honeycomb fired body was obtained by firing the degreased honeycomb dried body. The firing was performed at 1425° C. for 7 hours in the atmosphere. The temperature was raised to 1200 to 1425° C. for 5 hours. In this way, the honeycomb structure of Example 1 was manufactured.

The angle θ of the base portion of the protrusion was 45° in the cross section orthogonal to the extending direction of the cells of the honeycomb structure of Example 1. In addition, the height H of the protrusion was 0.14 mm. In addition, in the cross section orthogonal to the extending direction of the cells, the protrusions were disposed on each side as shown in the following Table 1. Specifically, as shown in FIG. 3, two protrusions were disposed on each of the four sides at equal intervals. Also, the area of the porous material disposition corner portion was 5% with respect to the reference area S which is the area of the porous material disposition area at all the porous material disposition corner portions (shown in a column of "porous material disposition area" in the following Tables 1 and 3). Further, the ratio (the total number of porous material disposition corner portions/ the number of all intersections×100) of the total number of porous material disposition corner portions to the total number of intersections of two adjacent partition walls configuring the peripheral edge of the cell was 50% (shown in the column of the "ratio of the total number of porous material disposition corner portions" in the following Tables 1 and 3). The shape of the obtained honeycomb structure was the same as the inverted shape of the die.

The angle θ of the protrusion and the height H of the protrusion were measured by the profile projector ("Small CNC image measuring machine quick vision ELF (QV ELF)" manufactured by Mitutoyo Co.) and the image analysis software ("QVPAC" manufactured by Mitutoyo Co.). In addition, the position of the protrusions on the side was confirmed. Specifically, the measurement and confirmation were performed by first photographing the end face of the honeycomb structure using the profile projector to obtain an image, binarizing the image, and then using the measurement function of the image analysis software.

The angle of the protrusion was measured as follows. First, the straight line parallel to the base line F was drawn at a position of ½ of the "height H of the protrusion", and the intersection K of the straight line and each side (side surface) of a triangle excluding the base line F was obtained. Thereafter, the tangential line to the side surface at the intersection K was drawn, and an angle formed by this tangential line and the base line F was obtained, which was defined as the angle θ. It should be noted that the "height H of the protrusion" means the shortest distance from the highest position of the protrusion to the base line F.

In the honeycomb structure of Example 1, the thickness (mm) of the partition wall, the porosity (%) of the partition walls, and the cell density (number/cm$^2$) were measured by the following method. The thickness (mm) of the partition wall and the cell density (number/cm$^2$) were measured by the profile projector and the image analysis software, and the porosity (%) of the partition walls was measured by a mercury porosimetry. The results are shown in the following Table 1. In the following Tables 1 and 3, the "Porosity (%) of partition walls" is indicated as "porosity (%)".

TABLE 1

| | Thickness of partition wall (mm) | Cell density (cell/cm$^2$) | Porosity (%) | The number of protrusions per side (number) | Angle of protrusion (°) | Cell shape | Disposition area of porous material (%) | Ratio of the total number of porous material disposition corner potion (%) |
|---|---|---|---|---|---|---|---|---|
| Comparative Example 1 | 0.089 | 62 | 35 | 2 | 45 | Quadrangle | 0 | 0 |
| Example 1 | 0.089 | 62 | 35 | 2 | 45 | Quadrangle | 5 | 50 |
| Example 2 | 0.089 | 62 | 35 | 2 | 45 | Quadrangle | 10 | 100 |
| Example 3 | 0.089 | 62 | 35 | 2 | 45 | Quadrangle | 30 | 100 |
| Example 4 | 0.089 | 62 | 35 | 2 | 45 | Quadrangle | 40 | 100 |
| Example 5 | 0.089 | 62 | 35 | 2 | 45 | Quadrangle | 50 | 100 |
| Comparative Example 2 | 0.089 | 62 | 35 | 2 | 45 | Quadrangle | 60 | 100 |
| Example 6 | 0.089 | 62 | 35 | 2 | 45 | Quadrangle | 20 | 60 |
| Example 7 | 0.089 | 62 | 35 | 2 | 45 | Quadrangle | 20 | 80 |
| Example 8 | 0.089 | 62 | 35 | 2 | 40 | Quadrangle | 20 | 50 |
| Example 9 | 0.089 | 62 | 35 | 2 | 65 | Quadrangle | 20 | 50 |
| Example 10 | 0.089 | 62 | 35 | 2 | 70 | Quadrangle | 20 | 50 |
| Example 11 | 0.089 | 62 | 35 | 2 | 30 | Quadrangle | 20 | 50 |
| Example 12 | 0.089 | 62 | 35 | 2 | 80 | Quadrangle | 20 | 50 |
| Example 13 | 0.089 | 62 | 35 | 3 | 45 | Quadrangle | 20 | 50 |
| Example 14 | 0.089 | 62 | 35 | 4 | 45 | Quadrangle | 20 | 50 |

The columns of the "number of protrusions per side" in the above Table 1 and the following Table 3 indicate the number of protrusions disposed on each of the four sides (the first side α to the fourth side σ (see FIG. 3)) of the quadrangular cell. In the above Table 1 and the following Table 3, the columns of the "Disposition area of porous material" indicate the area of the porous material when the porous material is disposed in the porous material disposition region.

(LA-4 Test)

For the manufactured honeycomb structure, a test was performed as follows based on the LA-4 mode of Federal Test Procedure in the United States. First, 200 g/L of catalyst (three-way catalyst) was loaded on the partition walls of the honeycomb structure. The honeycomb structure in which the catalyst is loaded was subjected to aging treatment at 950° C. for 12 hours by using an electric furnace. Next, the LA-4 test was performed while the honeycomb structure in which the catalyst is loaded is mounted on an underfloor position of a vehicle with the displacement of 2400 cc. In the LA-4 test, a direct modal mass for each gas component was measured using an exhaust gas measurement device (model number "MEXA-7400" manufactured by HORIBA Co.). In addition, the emission amount of HC as the representative exhaust gas component was measured. The space velocity of the exhaust gas by this test was about 10000 (1/hour) (high flow rate).

In the honeycomb structure, the emission amount of the exhaust gas of the second peak from acceleration becomes particularly large. For this reason, the ratio of the integrated value of the modal mass at the start of the acceleration of the second peak and the integrated value of the modal mass at the end of acceleration of the second peak was calculated to obtain the HC emission increment (%) before and after the second peak from the acceleration. The results are shown in the following Table 2. In the following Table 2, the "HC emission increment before and after the second peak from the acceleration in the test based on the LA-4 mode" is expressed as the "HC emission increment before and after the second peak in the LA-4".

(Determination on LA-4 Test)

Compared with the honeycomb structure in which the partition walls do not have the protrusions, the honeycomb structure in which the partition walls have the protrusions is advantageous in Bag emission, and therefore the HC emission increment (%) before and after the second peak from the acceleration needs to be equal to or less than 35%. For this reason, the determination on the LA-4 test was made based on the following criteria.

Determination "Good": The case in which the HC emission increment (%) before and after the second peak from the acceleration is equal to or less than 35% is defined as "good".

Determination "Not acceptable": The case in which the HC emission increment (%) before and after the second peak from the acceleration exceeds 35% is defined as "not acceptable".

In addition, in the honeycomb structure, as the time at which the catalyst reaches the activation temperature is early, the purification of the exhaust gas is started earlier, such that the emission amount of the exhaust gas which is not purified is decreased. Here, as the porous materials are disposed at the corner portions of the cells, the weight of the honeycomb structure is increased. In this case, since the heat capacity is increased, the time until the catalyst reaches the activation temperature becomes long. As a result, the emission amount of the exhaust gas is increased.

Compared to the honeycomb structure in which the partition walls do not have the protrusions, in order to make the honeycomb structure in which the partition walls have the protrusions advantageous in the Bag emission, the ratio of the HC emission increment before and after the first peak needs to be suppressed to be 175% or less. For this reason, the determination on the LA-4 test was performed based on the following criteria.

Determination "Good": The case in which the ratio of the HC emission increment before and after the first peak is equal to or less than 175% is defined as "good".

Determination "Not acceptable": The case in which the ratio of the HC emission increment before and after the first peak exceeds 175% is defined as "not acceptable".

The determination results of the LA-4 test are shown in the following Table 2.

TABLE 2

|  | HC emission increment before and after second peak in LA-4 | | HC emission increment before and after first peak in LA-4 | | Overall determination |
| --- | --- | --- | --- | --- | --- |
|  | (%) | Determination | (%) | Determination |  |
| Comparative Example 1 | 36 | Not acceptable | 120 | Good | Not acceptable |
| Example 1 | 32 | Good | 130 | Good | Good |
| Example 2 | 29 | Good | 145 | Good | Good |
| Example 3 | 28 | Good | 150 | Good | Good |
| Example 4 | 27 | Good | 160 | Good | Good |
| Example 5 | 26 | Good | 170 | Good | Good |
| Comparative Example 2 | 25 | Good | 180 | Not acceptable | Not acceptable |
| Example 6 | 30.5 | Good | 150 | Good | Good |
| Example 7 | 31.5 | Good | 160 | Good | Good |
| Example 8 | 31 | Good | 140 | Good | Good |
| Example 9 | 29 | Good | 160 | Good | Good |
| Example 10 | 28 | Good | 170 | Good | Good |
| Example 11 | 33 | Good | 135 | Good | Good |
| Example 12 | 27 | Good | 175 | Good | Good |
| Example 13 | 33 | Good | 170 | Good | Good |
| Example 14 | 33 | Good | 175 | Good | Good |

(Overall determination)

The overall determination was performed by the following criteria based on the determination on the LA-4 test.

Determination "Good": The case in which the determination on the HC emission increment (%) before and after the second peak from the acceleration is "good" and the determination on the HC emission increment before and after the first peak is "good" is defined as "good".

Determination "Not acceptable": The case in which either of the determination on the HC emission increment (%) before and after the second peak from the acceleration and the determination on the HC emission increment before and after the first peak is not "good" is defined as "not acceptable".

Examples 2 to 21, Comparative Examples 1 to 4

As shown in the above Table 1 and the following Table 3, except that the honeycomb structure was manufactured by changing the disposition area of the porous material, the ratio of the porous material disposition corner portion, and the ratio of the specific cell, the honeycomb structure was manufactured in the same manner as in Example 1.

TABLE 3

| | Thickness of partition wall (mm) | Cell density (cell/cm$^2$) | Porosity (%) | The number of protrusions per side (number) | Angle of protrusion (°) | Cell shape | Disposition area of porous material (%) | Ratio of the total number of porous material disposition corner potion (%) |
|---|---|---|---|---|---|---|---|---|
| Comparative Example 3 | 0.089 | 62 | 35 | 2 | 45 | Hexagon | 0 | 0 |
| Example 15 | 0.089 | 62 | 35 | 2 | 45 | Hexagon | 5 | 50 |
| Example 16 | 0.089 | 62 | 35 | 2 | 45 | Hexagon | 10 | 100 |
| Example 17 | 0.089 | 62 | 35 | 2 | 45 | Hexagon | 30 | 100 |
| Example 18 | 0.089 | 62 | 35 | 2 | 45 | Hexagon | 40 | 100 |
| Example 19 | 0.089 | 62 | 35 | 2 | 45 | Hexagon | 50 | 100 |
| Comparative Example 4 | 0.089 | 62 | 35 | 2 | 45 | Hexagon | 60 | 100 |
| Example 20 | 0.089 | 62 | 35 | 2 | 45 | Hexagon | 20 | 60 |
| Example 21 | 0.089 | 62 | 35 | 2 | 45 | Hexagon | 20 | 80 |

TABLE 4

| | HC emission increment before and after second peak in LA-4 | | HC emission increment before and after first peak in LA-4 | | Overall determination |
|---|---|---|---|---|---|
| | (%) | Determination | (%) | Determination | |
| Comparative Example 3 | 36 | Not acceptable | 110 | Good | Not acceptable |
| Example 15 | 33 | Good | 125 | Good | Good |
| Example 16 | 29 | Good | 145 | Good | Good |
| Example 17 | 28 | Good | 150 | Good | Good |
| Example 18 | 27 | Good | 160 | Good | Good |
| Example 19 | 26 | Good | 170 | Good | Good |
| Comparative Example 4 | 24 | Good | 180 | Not acceptable | Not acceptable |
| Example 20 | 30.5 | Good | 150 | Good | Good |
| Example 21 | 31.5 | Good | 160 | Good | Good |

Even in the honeycomb structures of Examples 2 to 21 and Comparative Examples 1 to 4, the thickness (mm) of the partition wall, the porosity (%) of the partition walls, and the cell density (number/cm$^2$) were measured in the same manner as in Example 1 and the LA-4 test was performed. The results are shown in the above Tables 2 and 4.

(Result)

As shown in the above Tables 2 and 4, it is understood that the honeycomb structures of Examples 1 to 21 have more improved the purification performance of the exhaust gas after the loading of the catalyst, as compared with the honeycomb structures of Comparative Examples 1 to 4.

The honeycomb structure of the present invention can be used as the catalyst carrier for the exhaust gas purification to purify the exhaust gas.

DESCRIPTION OF REFERENCE NUMERALS

1: Partition wall,
1x: Surface of partition wall,
2: Cell,
2a: Specific cell,
10: Honeycomb structure body,
11: First end face,
12: Second end face,
20: Circumferential wall,
21: Protrusion,
21a: Reference protrusion,
21x: Neighboring side surface,
30: Porous material disposition region,
31: Porous material disposition corner portion,
α: First side,
β: Second side,
γ: Third side,
σ: Fourth side,
A: Bottom part,
B: Top part,
F: Base line (plane),
H: Height of protrusion,
K: Intersection,
K$_O$: Reference intersection,
S: Reference area.

What is claimed is:

1. A honeycomb structure comprising: a pillar-shaped honeycomb structure body having porous partition walls which are disposed in a lattice shape in a cross section orthogonal to an extending direction of cells to surround a plurality of cells as a fluid channel extending from a first end face to a second end face and a circumferential wall disposed to surround the partition walls,
wherein the partition walls are provided with protrusions which protrude to extend into the cells and are continuously disposed in the extending direction of the cells,
at least one of the plurality of cells includes a specific cell configured so that the protrusions protrude into the cell from the respective partition walls configuring a peripheral edge of the cell, in the cross section orthogonal to the extending direction of the cells, and
the specific cell includes a pentagonal area which is formed by connecting an intersection of two partition walls configuring the peripheral edge of the specific cell and two points of bottom parts and top parts, respectively, of the respective protrusions disposed on the two partition walls, in the cross section orthogonal to the extending direction of the cells, wherein 5 to 50% of the pentagonal area is filled with a porous material made of the same material as the partition walls.

2. The honeycomb structure of claim 1, wherein when a part configured by disposing the porous material in the range of 5 to 50% including the intersection is a porous material disposition corner portion, a ratio of the total number of porous material disposition corner portions to the total number of intersections on the two adjacent partition walls configuring the peripheral edge of the cell is 50 to 100%.

* * * * *